US 6,434,385 B1

(12) United States Patent
Aucoeur

(10) Patent No.: US 6,434,385 B1
(45) Date of Patent: Aug. 13, 2002

(54) TRANSFER CONTROL POINT, MOBILE TELEPHONE FIXED TERMINAL AND SWITCH CAPABLE OF BEING USED IN A DEVICE FOR CONNECTING A TELEPHONE SWITCH LOCATED IN AN ISOLATED COMMUNITY TO A FIXED TELEPHONE NETWORK

(75) Inventor: Jean-Pierre Aucoeur, Cormeilles (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/402,535

(22) PCT Filed: Feb. 15, 1999

(86) PCT No.: PCT/FR99/00325

§ 371 (c)(1),
(2), (4) Date: Oct. 6, 1999

(87) PCT Pub. No.: WO99/41917

PCT Pub. Date: Aug. 19, 1999

(30) Foreign Application Priority Data

Feb. 16, 1998 (FR) .............................................. 98 01821

(51) Int. Cl.⁷ ................................................ H04Q 7/20
(52) U.S. Cl. ...................... 455/430; 455/554; 455/427; 455/428; 455/430; 455/12.1
(58) Field of Search ................................. 455/554, 427, 455/428, 430, 12.1

(56) References Cited

U.S. PATENT DOCUMENTS

| | | | | |
|---|---|---|---|---|
| 4,890,315 A | * | 12/1989 | Bendixen ...................... 379/59 |
| 5,544,227 A | | 8/1996 | Blust et al. | |
| 5,564,072 A | * | 10/1996 | Aguilera ..................... 455/56.1 |
| 5,596,624 A | * | 1/1997 | Armbruster ................... 379/58 |
| 5,787,355 A | * | 7/1998 | Bannister .................... 455/458 |
| 5,787,364 A | * | 7/1998 | Exner .......................... 455/560 |
| 5,818,919 A | * | 10/1998 | Berberich, Jr. .............. 379/211 |
| 5,887,256 A | * | 3/1999 | Lu ............................... 455/426 |
| 6,064,891 A | * | 4/2000 | Aucoeur ...................... 455/555 |
| 6,075,985 A | * | 6/2000 | Kao ............................. 455/422 |
| 6,081,716 A | * | 6/2000 | Lu ............................... 455/445 |
| 6,151,510 A | * | 11/2000 | Zicker ......................... 455/553 |
| 6,243,593 B1 | * | 6/2001 | Zicker ......................... 455/553 |
| 6,256,512 B1 | * | 7/2001 | Verdonk ...................... 455/554 |
| 6,285,879 B1 | * | 9/2001 | Lechner ...................... 455/432 |
| 6,311,073 B1 | * | 10/2001 | Charpentier ................ 455/560 |

FOREIGN PATENT DOCUMENTS

| | | |
|---|---|---|
| WO | WO 95/29565 | 11/1995 |
| WO | WO 96/24225 | 8/1996 |

OTHER PUBLICATIONS

C. Braendstroem et al, "Fixed Cellular Systems an Alternative Way to Provide Basic Telephony", Ericsson Review, vol. 73, No. 1, Jan. 1, 1996, pp. 4–13, XP000584595.

* cited by examiner

Primary Examiner—William Trost
Assistant Examiner—Marcos L. Torres
(74) Attorney, Agent, or Firm—Sughrue Mion, PLLC

(57) ABSTRACT

The system connects a fixed telephone network (PSTN) to a telephone switch (SW) in an isolated region via a mobile telephone network (PLMN) of a type derived from the GSM type, and including at least one satellite (S), a plurality of fixed user terminals (UT1, . . . , UT100) being connected to that telephone switch. The system includes a plurality of fixed mobile telephone terminals (RTa, . . . , RTn) and a transfer control point (TCP) connecting the fixed network (PSTN) to a mobile services switching center (MSC) to manage dynamically allocation of trunks (Ca, Cb, . . . , Cn) supported by those fixed mobile telephone terminals (RTa, . . . RTn) to telephone calls setup between the fixed telephone network (PSTN) and the user terminals (UT1, . . . , UT100) in the isolated region.

6 Claims, 4 Drawing Sheets

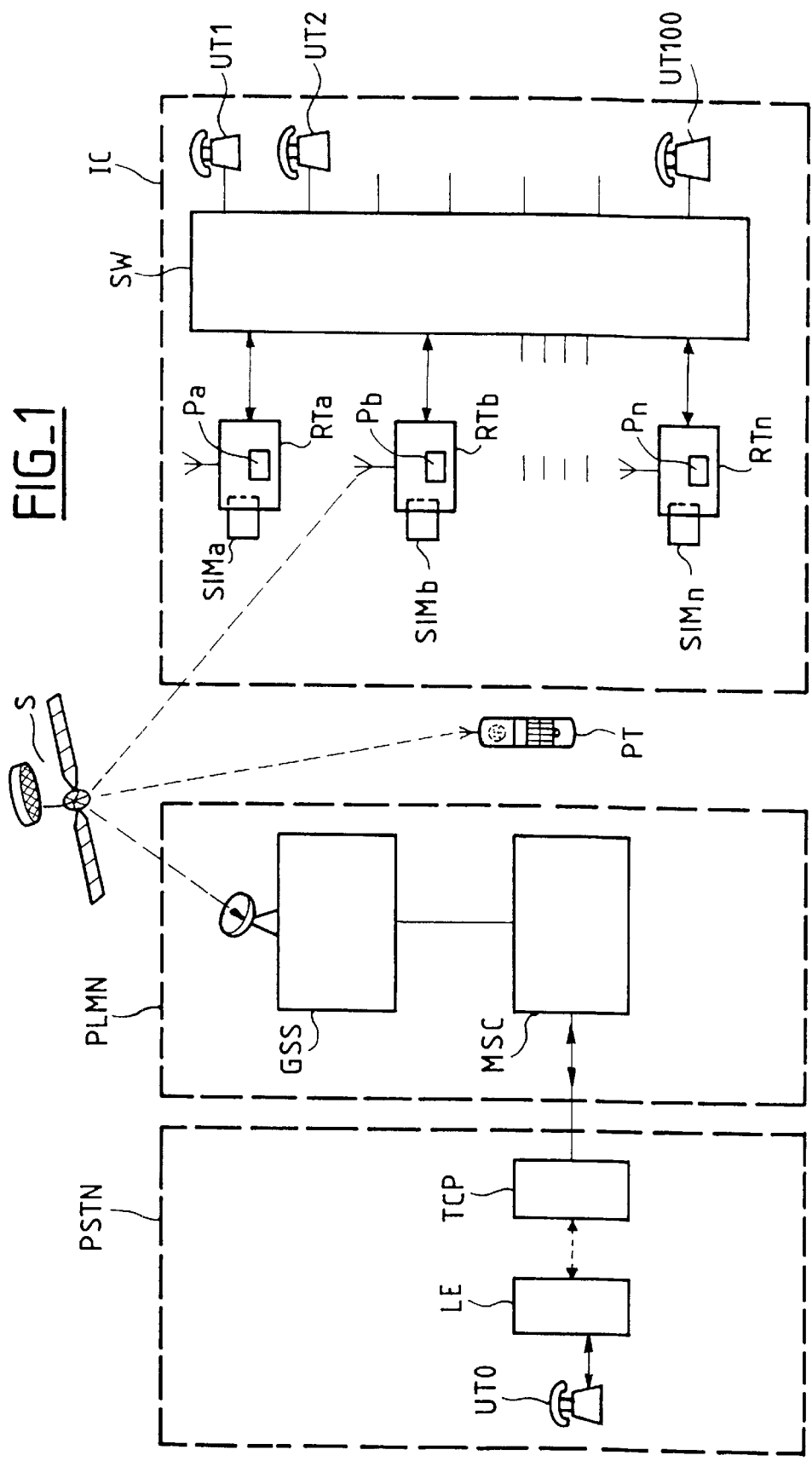

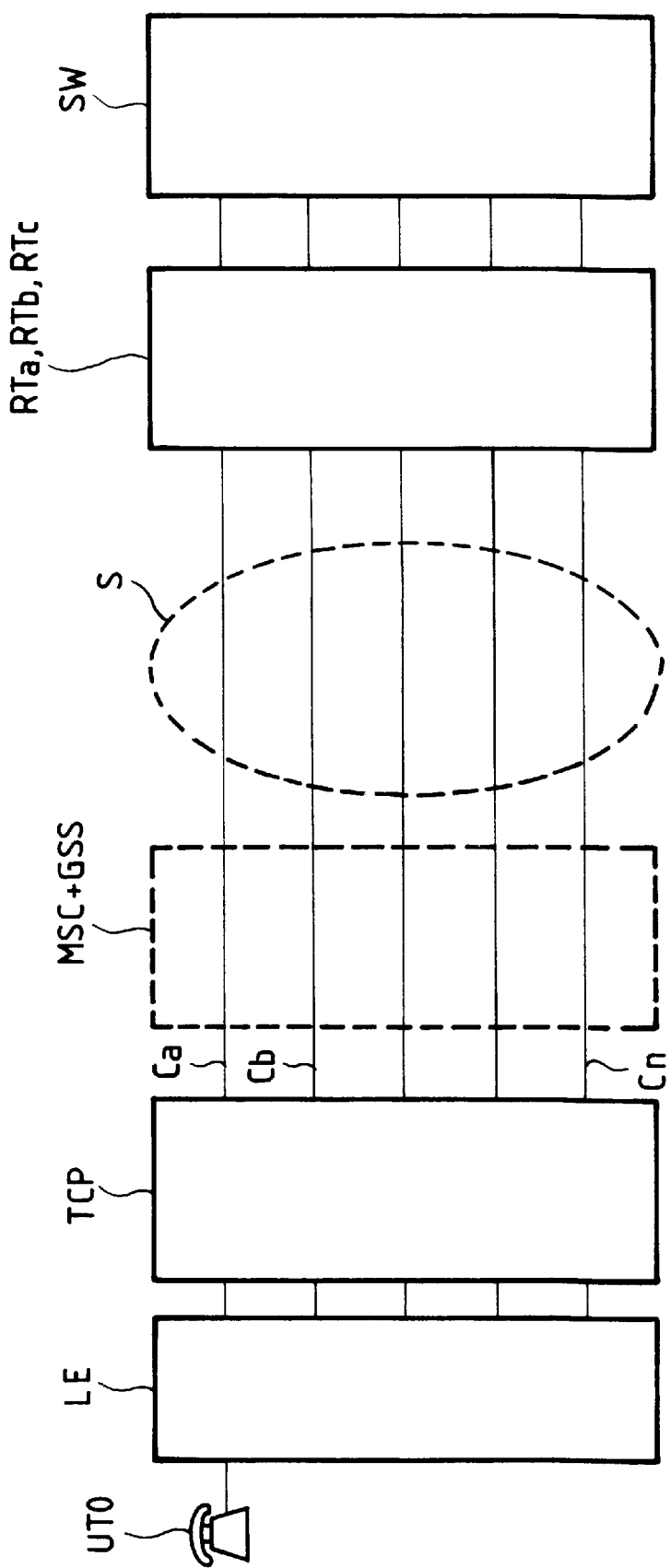

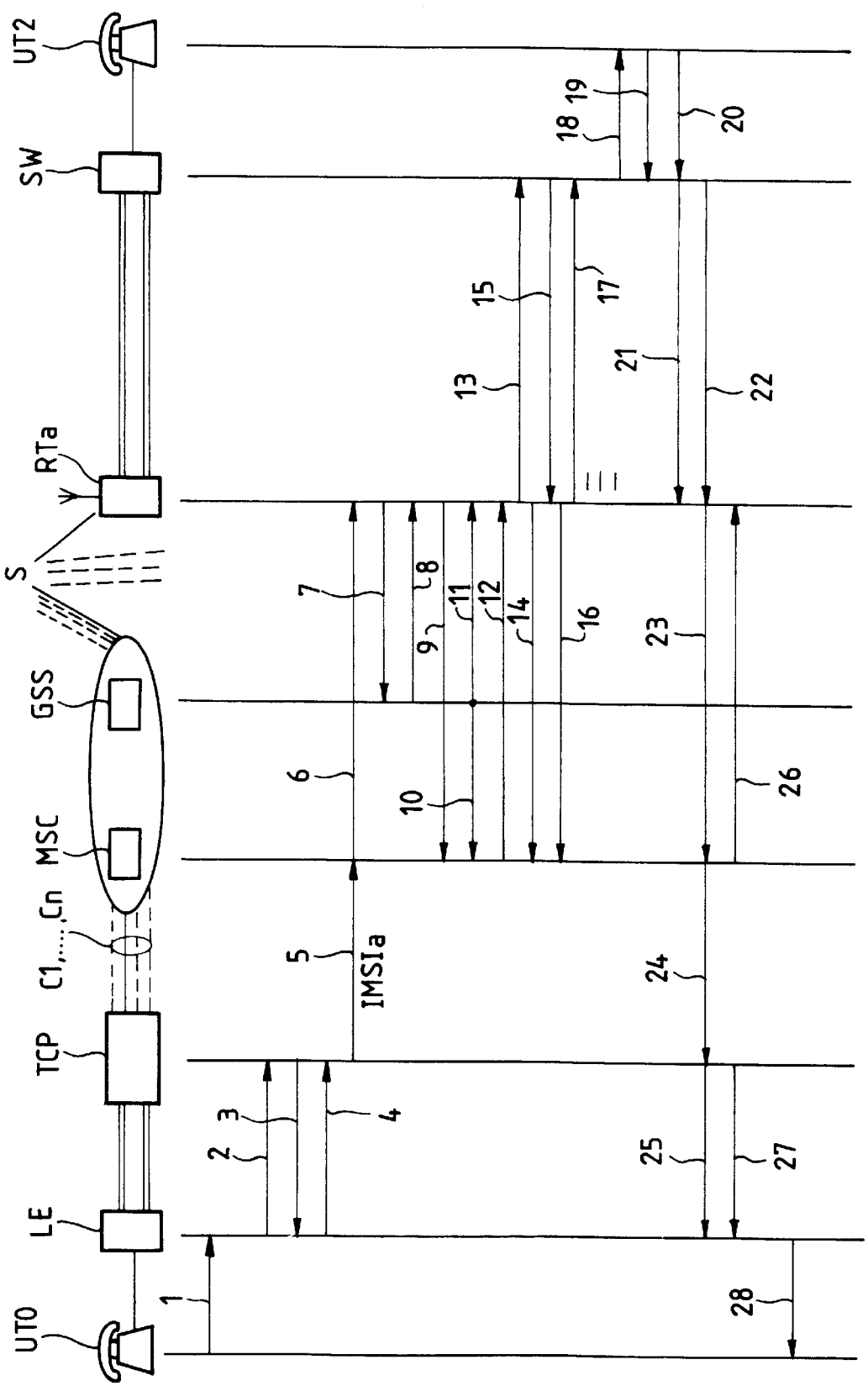
FIG_3

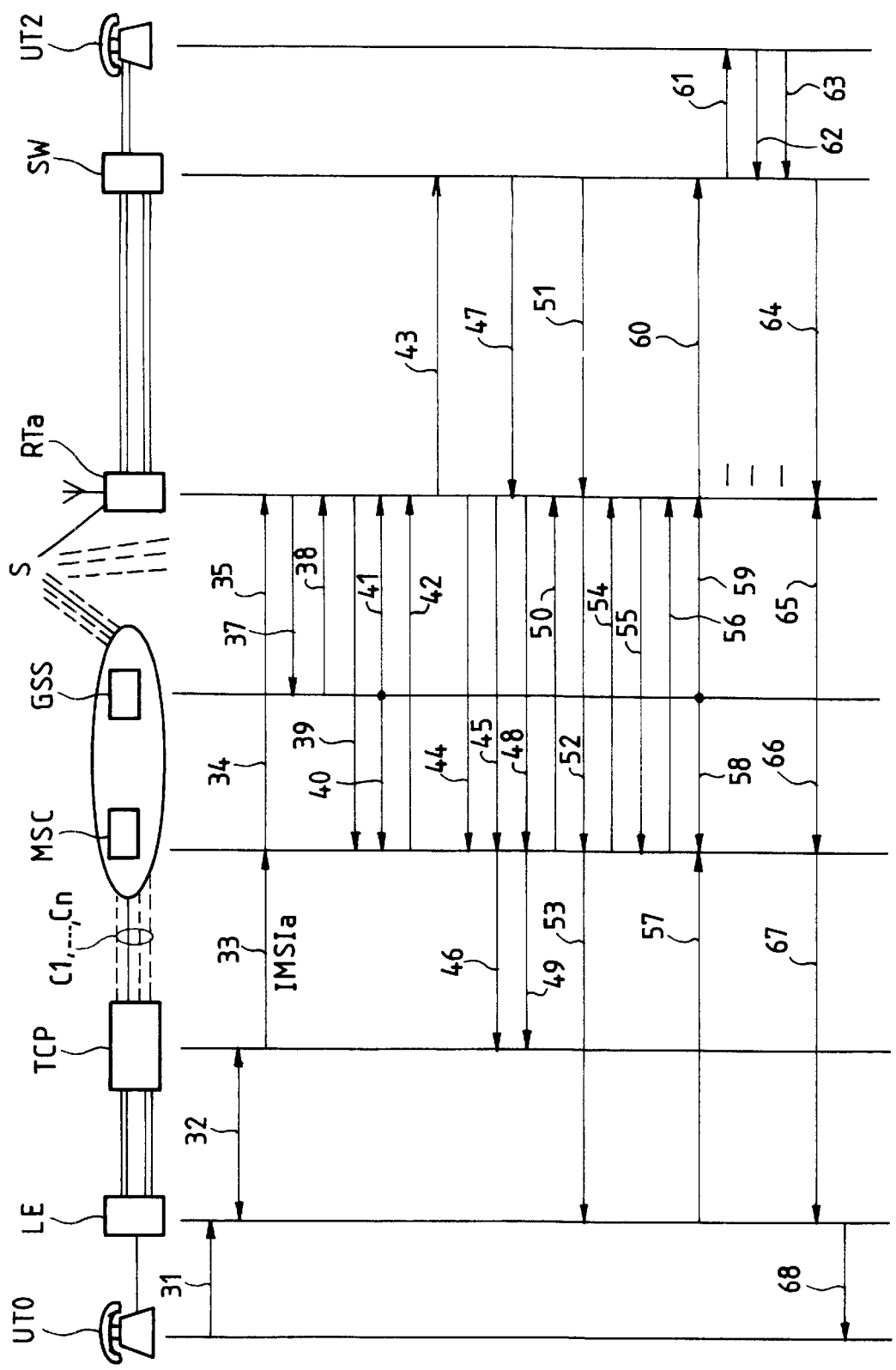

TRANSFER CONTROL POINT, MOBILE TELEPHONE FIXED TERMINAL AND SWITCH CAPABLE OF BEING USED IN A DEVICE FOR CONNECTING A TELEPHONE SWITCH LOCATED IN AN ISOLATED COMMUNITY TO A FIXED TELEPHONE NETWORK

BACKGROUND OF THE INVENTION

The invention concerns a system for connecting a first fixed telephone network to a second fixed telephone network via a mobile telephone network incorporating one or more satellites, a plurality of "fixed" mobile telephone terminals replacing a cable connection conventionally called a trunk when it connects two exchanges. Each "fixed" mobile telephone terminal implements functions analogous to those of a conventional portable mobile telephone terminal but can be connected via a local exchange of the second fixed telephone network to any fixed terminal of the second fixed telephone network, rather than being used by a single user.

The system of the invention can be used to connect a national public telephone network to a regional public network serving a town in an isolated region where installing a cable or some other terrestrial infrastructure would be too costly. The original network includes at least one exchange serving a group of fixed user terminals and routing calls arriving from the first network. Because the user terminals are not used continuously, each "fixed" mobile telephone terminal is used in succession for different user terminals. A plurality of mobile telephone terminals can share the same frequency band on a time-division or code-division basis.

The invention is more particularly concerned with mobile radio networks of a type derived from the GSM type and including a geostationary satellite or non-geostationary satellites. Networks of the GSM type and derived types have the following features:

Each geographical area is divided into cells to enable carrier frequencies to be re-used.

A gateway manages the resources of each cell in terms of carrier frequencies and the channels carried by each carrier frequency.

At least one mobile radio service switching center manages calls, connections to the fixed telephone network and databases containing the mobile station ISDN directory number (MS-ISDN), the International Mobile Subscriber Identity (IMSI) and the location of each mobile subscriber, using databases known as the Visitor Location Register (VLR) and the Home Location Register (HLR).

Conventional GSM networks and networks derived from them are not designed so that more than one subscriber can use the same user terminal. Users personalize their terminal by inserting into it a Subscriber Identification Module (SIM) card containing an IMSI which determines the account to which calls are billed. After an initialization phase, the terminal is designated in radio messages by a Temporary Mobile Subscriber Identity (TMSI) which preserves the anonymity of the user. An authentication procedure uses a secret key stored in the SIM card to prevent fraudulent misuse of the IMSI or the TMSI of another user when a call is sent and when a call is received.

Using a plurality of "fixed" mobile telephone terminals to link first and second fixed telephone networks gives rise to the problem of coordinating the mobile telephone terminals, because it must not be possible for more than one mobile telephone terminal to attempt to receive the same call.

The problem also arises of selecting a user terminal at the time of an incoming call because, in a conventional GSM network, a radio link transmits a number designating the called radio terminal when a call to a radio terminal is set up. In no case is there any provision for transmitting a number for discriminating between a plurality of user terminals connected to the same "fixed" mobile telephone terminal via a local exchange of the second network.

SUMMARY OF INVENTION

The aim of the invention is to propose a system that addresses the above problems.

The invention consists firstly in a transfer control point for use in a system for connecting a telephone switch in an isolated region to a fixed telephone network via trunks supported by a plurality of "fixed" mobile telephone terminals of a mobile telephone network, a plurality of user terminals being connected to the telephone switch, at least one transfer control point connecting the fixed telephone network and a mobile services switching center which is part of the mobile telephone network, the mobile services switching center connecting all the trunks supported by the "fixed" mobile telephone terminals to the transfer control point, the transfer control point including:

means for making calls to the "fixed" mobile telephone terminals, and means for dynamically managing the assignment of the trunks supported by the "fixed" mobile telephone terminals to telephone calls set up between the fixed telephone network and the user terminals connected to the switch in an isolated region, and being characterized in that it further includes means for transmitting the international mobile subscriber number of a mobile telephone terminal to the mobile services switching center by placing that number in the "called address" field of the SETUP message sent when setting up a connection supported by one of the "fixed" mobile telephone terminals.

The above transfer control point coordinates the mobile telephone terminals by placing a number designating a fixed radio terminal in the "called address" field of the SETUP message sent to a switching center when a connection is set up.

In a preferred embodiment of the invention, a transfer control point is characterized in that it further includes means for transmitting the directory number of the called user terminal to the mobile services switching center by placing that number in the "called sub-address" field of the SETUP message sent when setting up a connection supported by a "fixed" mobile telephone terminal.

In a preferred embodiment of the invention, a transfer control point is characterized in that it further includes means for forwarding to a local exchange of the fixed telephone network the directory number of a user terminal of the fixed telephone network when that terminal is called by a user terminal which is connected to the switch in the isolated region by placing that number in the "called address" field of a SETUP message sent to said local exchange when setting up a connection supported by a "fixed" mobile telephone terminal.

The invention consists secondly in a "fixed" mobile telephone terminal for use in a system for connecting a telephone switch in an isolated region to a fixed telephone network via a plurality of "fixed" mobile telephone terminals of a mobile telephone network, a plurality of user terminals being connected to the telephone switch, at least one transfer control point connecting the fixed telephone network and a mobile services switching center which is part of the mobile telephone network, the mobile services switching center connecting all the trunks supported by the "fixed" mobile telephone terminals to the transfer control point, characterized in that it includes means for extracting from a SETUP message the directory number of a called user terminal which is connected to the switch in the isolated region, and for sending that number to the switch in an isolated region in the form of a conventional signaling message.

The above "fixed" mobile telephone terminal allows direct inward dialing in the case of a call from a terminal of the fixed telephone network to a terminal connected to an exchange in the isolated region.

The invention consists thirdly in a mobile services switching center for use in a mobile telephone network including "fixed" mobile telephone terminals connected to a telephone switch to which a plurality of user terminals in an isolated region is connected, at least one transfer control point connecting that mobile telephone network to a fixed telephone network, all the trunks supported by the "fixed" mobile telephone terminals terminating at the transfer control point, characterized in that it includes:

means for extracting the mobile subscriber directory number of a "fixed" mobile telephone terminal from the "called address" field of a SETUP message from the transfer control point, means for extracting the mobile directory number of a called user terminal from the "called sub-address" field of the SETUP message from the transfer control point, means for paging the mobile telephone terminal corresponding to that number, means for preparing a new SETUP message by placing the mobile subscriber directory number of the "fixed" mobile telephone terminal in the "called address" field of that message and by placing the directory number of the called user terminal in the "called sub-address" field of that message, and means for sending that message to the "fixed" mobile telephone terminal.

The mobile services switching center enables direct inward dialing to any terminal connected to the exchange in an isolated region by an incoming call from a user terminal which is part of the conventional telephone network.

The invention consists fourthly in a mobile services switching center for use in a mobile telephone network including "fixed" mobile telephone terminals connected to a telephone switch to which a plurality of user terminals in an isolated region is connected, at least one transfer control point connecting that mobile telephone network to a fixed telephone network, the mobile services switching center connecting the trunks supported by the "fixed" mobile telephone terminals to that transfer control point, characterized in that it includes:

means for extracting the directory number of the transfer control point from the "called address" field of a SETUP message from the switch, means for extracting the directory number of a called user terminal which is part of the fixed telephone network from the "called sub-address" field of the SETUP message from the switch, and means for preparing another SETUP message and forwarding the extracted directory number to the transfer control point by placing it in the "called address" field of that other SETUP message.

The above mobile services switching center enables direct inward dialing to a user terminal which is part of the conventional telephone network by an incoming call from a terminal connected to the exchange in the isolated region.

BRIEF DESCRIPTION OF DRAWING

The invention is explained further and other features of the invention become apparent in the following description and the accompanying figures:

FIG. 1 is the block diagram of an embodiment of the system of the invention in one example of its application.

FIG. 2 shows the theory of the operation of this embodiment.

FIG. 3 is a timing diagram showing the operation of a first variant of the system of the invention when setting up a call in this application example.

FIG. 4 is a timing diagram showing the operation of a second variant of the system of the invention when setting up a call in this application example.

DESCRIPTION OF INVENTION

FIG. 1 represents the block diagram of one example of application of the system of the invention to providing the services of a public switched telephone network (PSTN) to a community IC in an:isolated region. The isolated community IC is served by a switch SW to which 100 conventional terminals UT1, ..., UT100 are connected, for example. The switch SW is connected to the PSTN via a Public Land Mobile Network (PLMN) of a type derived from the GSM type.

The PLMN includes a geostationary satellite or a plurality of non-geostationary satellites and mainly serves mobile telephone terminals PT that are indeed "mobile". A mobile services switching center MSC is connected to a satellite S via a gateway GSS which maintains a radio link with the satellite S. The switch SW communicates with the satellite S by means of n mobile telephone terminals RTa, RTb, ..., RTn. Each "fixed" mobile telephone terminal RTa, RTb, ..., RTn is connected by a conventional telephone cable to the switch SW and includes an identity card reader device.

Each of n conventional cards SIMa, SIMb, ..., SIMn inserted in a respective reader stores a respective international mobile subscriber identity IMSIa, IMSIb, IMSIn and a respective secret key Ka, Kb, ..., Kn. Each "fixed" mobile telephone terminal RTa, RTb, ..., RTn has a respective directory number: MS-ISDNa, MS-ISDNb, MS-ISDNn.

The PSTN includes at least one transfer control point TCP providing access to the satellite S via the gateway GSS and the mobile services switching center MSC which serves the terminals RTa, RTb, ..., RTn. A user terminal of the PSTN, for example terminal UT0, is connected to a local exchange LE which can communicate with the transfer control point TCP. In other examples it could be connected to the exchange LE via a private branch exchange.

Each "fixed" mobile telephone terminal RTa, RTb, ... RTn has a respective processor Pa, Pb, ..., Pn running a program that determines the operation of the terminal. Its operation is identical to that of a conventional mobile telephone terminal of the GSM type or of a type derived from the GSM type, apart from the function for identifying the called terminal and the direct inward dialing function specific to the system of the invention. A preferred embodiment of the invention uses a conventional mobile telephone terminal of the GSM type or of a type derived from the GSM type and merely modifies the program of the processor to provide the functions specific to the system of the invention.

Each mobile telephone terminal RTa, RTb, . . . , RTn can be in only one of the following two states:
  either in telephone communication with the PLMN,
  or available, a terminal being deemed to be available even if it is in the process of carrying out a location or authentication procedure.

A terminal which is available is listening out for paging messages. It changes state when the PLMN calls it to set up a call. The authentication and location procedures are performed by the terminal in a conventional manner. When a mobile telephone terminal RTa, RTb, . . . , RTn sets up a connection for an incoming call from the PLMN or an outgoing call from a terminal UT1, . . . , UT100, the mobile telephone terminal must be authenticated to prevent fraud. One authentication procedure is a standardized GSM procedure using a secret key stored on the SIM card. The authentication procedure uses a secret key specific to the mobile telephone terminal concerned and supplied to it by its SIM card.

If a mobile telephone terminal receives a message which contains a TMSI instead of an IMSI, the processor of the terminal compares it to the TMSI stored in its memory.

In this example, the PSTN identifies all the user terminals UT1, . . . , UT100 by one hundred "fixed subscriber" type directory numbers.

FIG. 2 shows how this embodiment of the invention works. Each mobile telephone terminal RTa, RTb, . . . , RTn sets up a respective trunk Ca, Cb, . . . , Cn each of which can carry a telephone channel. According to the invention, the transfer control point TCP manages the use of these trunks as if the mobile services switching center MSC, the gateway GSS and the satellite S were transparent. It knows the status of and coordinates the use of the "fixed" mobile telephone terminal RTa, RTb, RTn. The trunks being used are shown in thicker line in the figure. A conventional mobile services switching center MSC can be used without any modification and there is no other co-ordination device in the "fixed" mobile telephone terminal RTa, RTb, . . . , RTn.

The direct inward dialing function is implemented as follows, and does not require any modification of the PLMN because it is covered by the GSM standard. In the direction from the PTSN to the community IC:

The TCP sends the MSC a SETUP message conforming to the ISDN signaling procedure, by placing the mobile subscriber directory number MS-ISDNa of the mobile telephone terminal RTa it has chosen from the available terminals in the "called address" field of the message.

The MSC extracts the MS-ISDNa from the SETUP message sent by the TCP and then pages the mobile telephone terminal RTa corresponding to the number MS-ISDNa.

The MSC prepares a new SETUP message conforming to the GSM signaling procedure by placing the extracted number MS-ISDNa in the "called address" field of the message. It places the directory number ISDN2 of the called terminal UT2, supplied to it by the local exchange LE, in the "called sub-address" field of the message.

The terminal RTa extracts the directory number ISDN2 from the SETUP message and forwards it to the switch SW to enable it to select the called user terminal.

The software of each terminal RTa, RTb, . . . , RTn is modified to extract the directory number of the called user terminal UT1, . . . , UT100 from the SETUP message received for setting up each call, and to send the number to the switch SW in the form of conventional signaling messages, using the R2 analog signaling protocol, for example, to enable the switch SW to select the called user terminal.

The selection process is as follows for a call from a user terminals UT1, . . . , UT100 of the community IC to a user terminal of the PSTN, for example terminal UTO:

The switch SW places a directory number MS-ISDNtcp designating the transfer control point TCP in the "called address" field of a SETUP message conforming to the GSM signaling procedure. It also places the directory number ISDNO of the called terminal UTO in the "called sub-address" field of the SETUP message. The switch SW knows the status of all the "fixed" mobile telephone terminal RTa, RTb, . . . , RTn to which it is connected. It chooses one of the available terminals, for example terminal RTa. It sends the SETUP message to the MSC when setting up a call supported by the "fixed" mobile telephone terminal RTa.

The MSC extracts the directory number ISDNO from the "called sub-address" field of the SETUP message.

The MSC knows the directory number ISDNtcp of the TCP. It calls the TCP using its directory number ISDNtcp.

The MSC then forwards the extracted directory number ISDNO to the TCP by placing it in the "called address" field of a new SETUP message conforming to the ISDN signaling procedure.

The TCP then forwards the directory number ISDNO to the local exchange LE.

FIG. 3 is a timing diagram showing in more detail how a first variant of the system cf the first variant sets up a call between a user terminal UTO connected to the PSTN and a user terminal of the isolated community IC, for example the terminal UT2:

1) A user lifts the handset of the terminal UTO and enters the directory number ISDN2 of the terminal UT2. That number indicates that it is necessary to set up a call via the transfer control point TCP.

2,3,4) The local exchange LE of the PSTN sends the transfer control point TCP a call set-up request message. The exchange LE and the TCP exchange messages to transmit the directory number ISDN2 designating the called terminal UT2 to the TCP digit by digit.

5) The TCP knows the status of all the trunks Ca, Cb, . . . , Cn. It chooses one of the available trunks Ca, Cb, . . . , Cn, for example trunk Ca and, in the case of an ISDN procedure referred to here by way of example, it sends a SETUP message conforming to the ISDN signaling procedure. The message is sent to the MSC to request it to set up a call. The TCP places in the SETUP message:

The international identifier MS-ISDNa of the radio terminal RTa that corresponds to the connected trunk Ca. This identifier is placed in the "called address" field of the SETUP message.

The directory number ISDN2 of the called user terminal UT2, which is placed in the "called sub-address" field of the SETUP message.

6) The MSC consults the databases of the GSM network to determine the geographical area of the radio terminal designated by MS-ISDNa, in the same manner as for a conventional mobile terminal. The HLR tells the MSC that the mobile telephone terminal concerned is in one of the geographical areas served by the satellite S. The MSC broadcasts a PAGING REQUEST message via the gateway GSS and the satellite S in that area to page the mobile telephone terminal RTa designated by the IMSIa or TMSIa. The "fixed" mobile telephone terminal RTa is available and is listening out for paging messages at the time concerned. It receives the message. It compares the received identifier IMISa with the IMSI stored in its SIM card. If the message contains an identifier TMSIa, the terminal RTa compares the identifier TMSIa received with the stored one. It is therefore able to recognize its identifier IMSIa (or TMSIa).

7) The terminal RTa then sends a PAGING RESPONSE message to the gateway GSS.

8) The gateway GSS responds to this message by allocating a radio channel to the terminal RTa.

9) The RTa then sends the MSC a message in response to the paging message via the gateway GSS.

10,11) The gateway GSS, the terminal RTa and the MSC exchange messages to perform the authentication and encryption procedure, in the conventional way.

12) The MSC sends the terminal RTa another SETUP message conforming to the GSM signaling procedure via the gateway GSS, this message requesting setting up of a connection and containing:

The number MS-ISDNa of the radio terminal RTa that corresponds to the connected trunk Ca, in this example, this identifier being placed in the "called address" field of the SETUP message.

The directory number ISDN2 of the called user terminal UT2, in the "called sub-address" field of the SETUP message.

13) The terminal RTa extracts the directory number ISDN2 of the user terminal UT2 from the SETUP message. It then sends a message to the switch SW to advise it of an incoming call.

14) The terminal RTa then sends the MSC a message to confirm that it is setting up a call to the called user terminal UT2.

15) The switch SW sends the terminal RTa a message requesting transmission of the first digit of the directory number of the called terminal UT2.

16) The terminal RTa sends an alert message to the MSC via the gateway GSS to advise it that a ringing signal is being sent to the called terminal UT2.

17) The terminal RTa sends the first digit of the directory number ISDN2 of the called terminal UT2 to the switch SW. The switch then asks it for the second digit, and so on.

18) The switch SW then sends a ringing signal to the called terminal UT2.

19) The terminal UT2 sends an acknowledgment to the switch SW.

20) A user raises the handset of the terminal UT2. This sends the switch SW a call set-up request message.

21) The switch SW sends the mobile telephone terminal RTa a message requesting setting up of the voice communication and starting charge metering.

22) The switch SW advises the terminal RTa that a user has answered the call.

23) The terminal RTa asks the MSC to connect the calling terminal UTO.

24) The MSC forwards this request to the TCP.

25) The TCP sends the local exchange LE a message requesting setting up of the connection and starting of charge metering.

26) The MSC sends an acknowledgment of the connection set-up request to the terminal RTa.

27) The TCP informs the local exchange LE that a user has answered.

28) The local exchange LE sends the calling terminal UTO a message advising it that the connection has been set up.

FIG. 4 is a timing diagram showing how a variant of the system of the invention sets up a call between a user terminal UTO connected to the PSTN and a user terminal UT2 of the isolated community IC:

31) A user lifts the handset of the terminal UTO and enters the directory number ISDN2 of the terminal UT2. This number tells the local exchange LE that it is necessary to set up a call via the transfer control point TCP.

32) The local switching center LE of the PSTN sends the transfer control point TCP a call set-up request message. It places the directory number ISDN2 of the called terminal UT2 in the message. The TCP acknowledges the message.

33) The TCP knows the status of all the trunks Ca, Cb, . . . , Cn. It chooses one of the available trunks Ca, Cb, . . . , Cn, for example trunk Ca, and sends a SETUP message conforming to the ISDN signaling procedure to the MSC to request it to set up a call. The TCP places in the SETUP message the identifier MS-ISDNa of the mobile telephone terminal RTa which corresponds to the selected trunk Ca. It is placed in the "called address" field of the SETUP message.

34) The MSC consults the GSM network databases to determine the geographical area in which the terminal designated by MS-ISDNa is located, in the same manner as for a conventional mobile terminal. The HLR tells it that the terminal RTa is in one of the geographical areas served by the satellite S. It broadcasts a PAGING REQUEST message via the gateway GSS and the satellite S in that area for the terminal designated by the identifier IMSIa or TMSIa. The "fixed" mobile telephone terminal RTa is available and is listening out for paging messages at the time concerned. It receives the message. It compares the received identifier IMISa with the IMSI stored in its SIM card. If the message contains an identifier TMSIa, the terminal RTa compares the identifier TMSIa received with the stored one. It is therefore able to recognize its identifier IMSIa (or TMSIa).

37) The terminal RTa then sends the gateway GSS a PAGING RESPONSE message.

38) The gateway responds to this message by allocating a radio channel to the terminal RTa.

39) The terminal RTa then sends the MSC a message in response to the paging message via the gateway GSS.

40,41) The gateway GSS, the terminal RTa and the MSC exchange messages in order to perform the authentication and encryption procedure.

42) The MSC sends the terminal RTa another SETUP message conforming to the GSM signaling procedure via the gateway GSS, this message requesting connection set-up and containing the number MS-ISDNa of the terminal RTa that corresponds to the trunk Ca, in this example, the number MS-ISDNa being placed in the "called address" field of the SETUP message.

43) The terminal RTa then sends the switch SW a message to advise it of an incoming call.

44) The terminal RTa then sends the MSC a message to confirm that it accepts the call.

45) The terminal RTa then sends the MSC an alert message.

46) The MSC transmits the alert to the TCP.

47) The switch SW sends the terminal RTa an acknowledgment message to acknowledge the message 43 advising it of an incoming call.

48) The terminal RTa sends the MSC a connection setup request message via the gateway GSS.

49) The MSC forwards the message to the TCP. The latter sets up the connection and therefore starts the charge metering process.

50) The MSC sends the terminal RTa a CONNECT ACK message to advise it that the connection has been set up.

51) The switch SW requests the terminal RTa to transmit the first digit of the called terminal number. This request is in the form of a Dual Tone Multi-Frequency (DTMF) character.

52) The terminal RTa requests the MSC to transmit the first digit in the form of a DTMF character.

53) The MSC requests the exchange LE to transmit the first digit.

54) The MSC sends the terminal RTa a START ACK DTMF message to acknowledge transmission of the request 52.

55) The terminal RTa sends the MSC a STOP DTMF message to request it to stop sending the DTMF character.

56) The MSC sends the terminal RTa a STOP ACK DTMF message to acknowledge the message 55.

57) The exchange LE sends the MSC the first digit of the directory number ISDN2 of the call terminal UT2.

58,59) The gateway GSS, the MSC and terminal RTa exchange messages in order to forward the first digit to the terminal RTa in the form of a DTMF character.

60) The terminal RTa sends the first digit to the switch SW. The switch then asks it for the second digit, and so on.

61) The switch SW then sends the called terminal UT2 a ringing signal.

62) The terminal UT2 sends the switch SW an acknowledgment.

63) The called user raises the handset of the terminal UT2. The latter sends the switch SW a call setup request message.

64) The switch SW sends the terminal RTa a voice call set-up request message.

65,66) The gateway GSS, the terminal RTa and the MSC exchange messages to indicate the end of transmission of the directory number ISDN2 and to request the local exchange LE to connect the calling terminal UTO.

67) The MSC forwards the request to the exchange LE via the TCP.

68) The local exchange LE sends the calling terminal UTO a message advising it that the connection has been set up.

In this embodiment, charge metering therefore begins before the call terminal UT2 has answered, and even if it is unable to answer. This may be inconvenient in some situations.

The invention is not limited to mobile telephone networks using satellites and derived from networks of the GSM type. The invention can also be applied to conventional GSM networks.

What is claimed is:

1. A transfer control point for use in a system for connecting a telephone exchange in an isolated region to a fixed telephone network via trunks supported by a plurality of fixed mobile telephone terminals of a mobile telephone network, a plurality of user terminals being connected to the telephone switch, at least one transfer control point connecting the fixed telephone network and a mobile services switching center which is part of the mobile telephone network, the mobile services switching center connecting all the trunks supported by the fixed mobile telephone terminals to the transfer control point, the transfer control point comprising:

means for making calls to the fixed mobile telephone terminals, means for dynamically managing the assignment of the trunks supported by the fixed mobile telephone terminals to telephone calls set up between the fixed telephone network and the user terminals connected to the switch in an isolated region, and means for transmitting the international mobile subscriber number of a mobile telephone terminal to the mobile services switching center by placing said international mobile subscriber number in the called address field of the SETUP message sent when setting up a connection supported by one of the fixed mobile telephone terminals.

2. A transfer control point according to claim 1, further comprising means for transmitting the directory number of the called user terminal to the mobile services switching center by placing said directory number of the called user terminal in the called sub-address field of the SETUP message sent when setting up a connection supported by one of the fixed mobile telephone terminals.

3. A transfer control point according to claim 1, further comprising means for forwarding, to a local exchange of the fixed telephone network, the directory number of a user terminal of the fixed telephone network when said user terminal is called by a user terminal connected to the switch in the isolated region, by placing said directory number in the called address field of a SETUP message sent to said local exchange when setting up said connection.

4. A fixed mobile telephone terminal for use in a system for connecting a telephone switch in an isolated region to a fixed telephone network, via trunks supported by a plurality of fixed mobile telephone terminals of a mobile telephone network, a plurality of user terminals being connected to the telephone switch, at least one transfer control point connecting the fixed telephone network and a mobile services switching center which is part of the mobile telephone network, the mobile services switching center connecting all the trunks to the transfer control point, the telephone terminal comprising:

a processor; and a program controlling the operation of the processor of the terminal, the operation of the program being identical to that of a conventional mobile telephone terminal according to the GSM standard except that the program includes means for:

extracting from a SETUP message the directory number of a called user terminal connected to the switch in the isolated region, and sending said directory number to the switch in the isolated region in the form of a conventional signaling message.

5. A mobile services switching center for use in a mobile telephone network including fixed mobile telephone terminals connected to a telephone switch to which a plurality of user terminals in an isolated region is connected, at least one transfer control point connecting said mobile telephone network to a fixed telephone network, the mobile services switching center connecting the trunks supported by the fixed mobile telephone terminals to the transfer control point, the mobile services switching center comprising:

means for extracting a first mobile subscriber directory number of a fixed mobile telephone terminal from the called address field of a SETUP message from the transfer control point, means for extracting a second mobile directory number of a called user terminal from the called sub-address field of said SETUP message, means for paging the mobile telephone terminal corresponding to said first mobile directory number, means for preparing a new SETUTP message by placing said first mobile subscriber directory number in the called address field of said new SETUP message and by placing the second mobile subscriber directory number of the called user terminal in the called sub-address field of said new SETUP message, and means for sending said new SETUP message to the fixed mobile telephone terminal.

6. A mobile services switching center for use in a mobile telephone network including fixed mobile telephone terminals connected to a telephone switch to which a plurality of user terminals in an isolated region is connected, at least one transfer control point connecting said mobile telephone network to a fixed telephone network, the mobile services switching center connecting the trunks supported by the fixed mobile telephone terminals to the transfer control point, the mobile services switching center comprising:

means for extracting a first directory number of the transfer control point from the called address field of a SETUP message from the switch, means for extracting a second directory number, of a called user terminal which is part of the fixed telephone network, from the called sub-address field of the SETUP message, and means for preparing another SETUP message and forwarding the extracted second directory number to the transfer control point by placing it in the called address field of said another SETUP message.

\* \* \* \* \*